May 14, 1968 R. J. SKIERA ET AL 3,382,897
BLENDED BEVERAGE DISPENSING MACHINE
Filed May 25, 1965 4 Sheets-Sheet 2
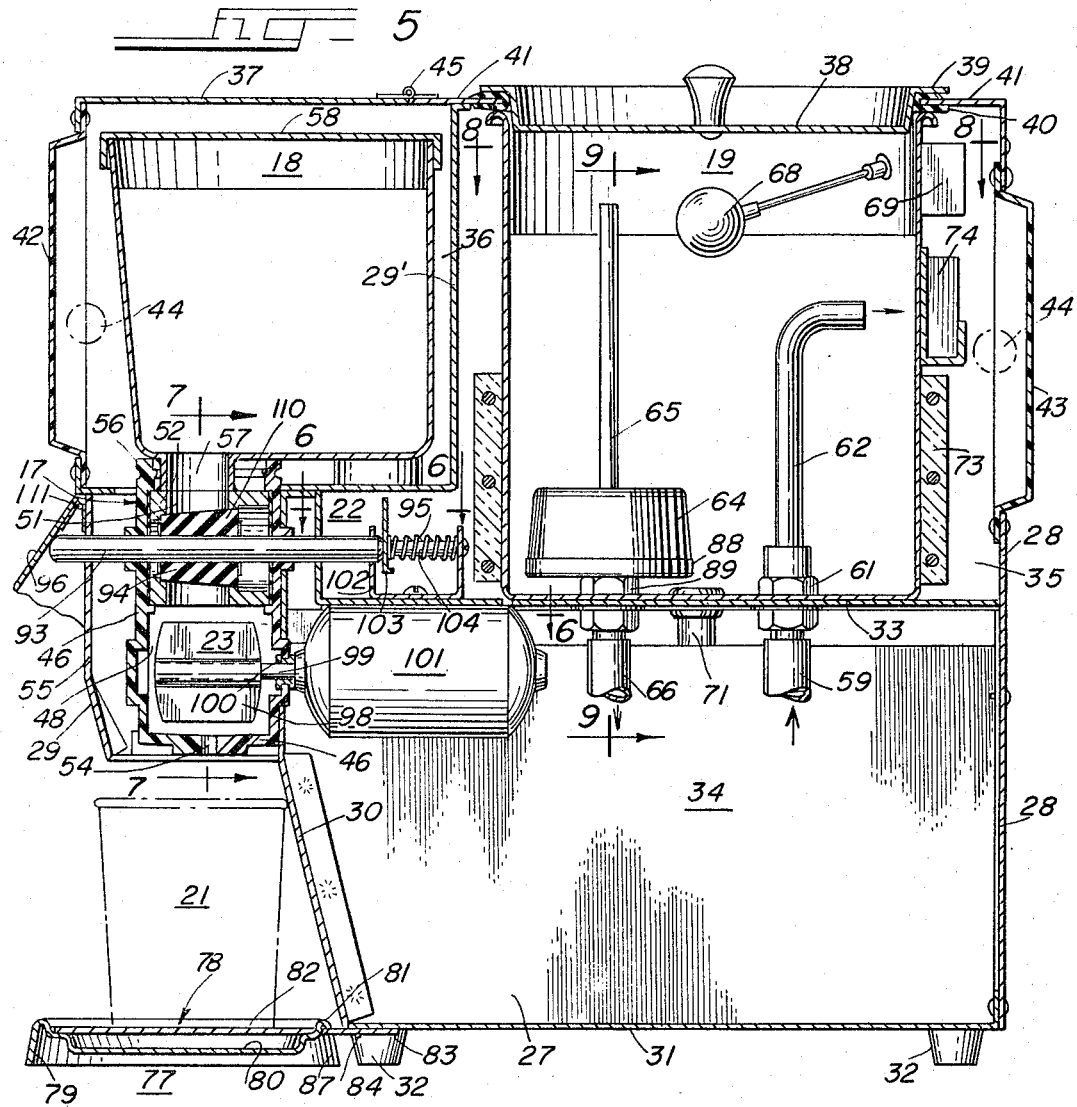
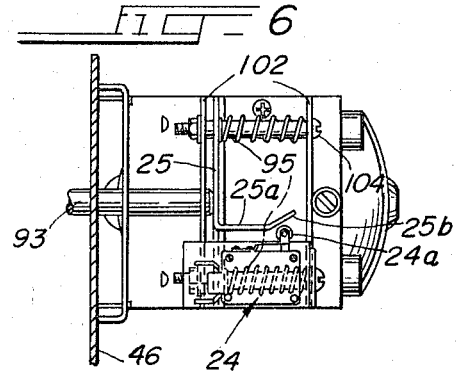
INVENTORS
RICHARD J. SKIERA
EDWARD M. MELCHIOR
BY
Rummler & Snow
ATTYS.

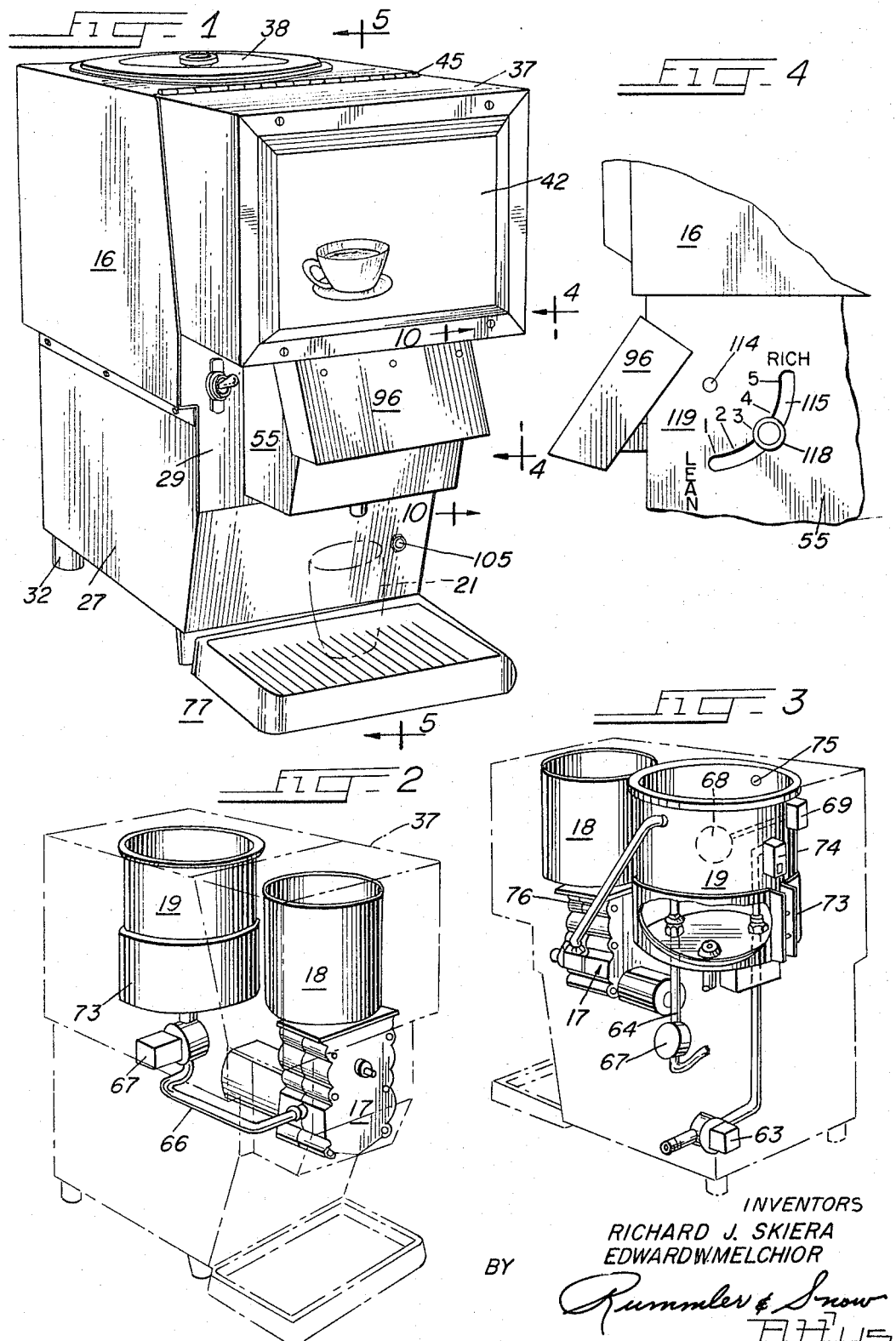

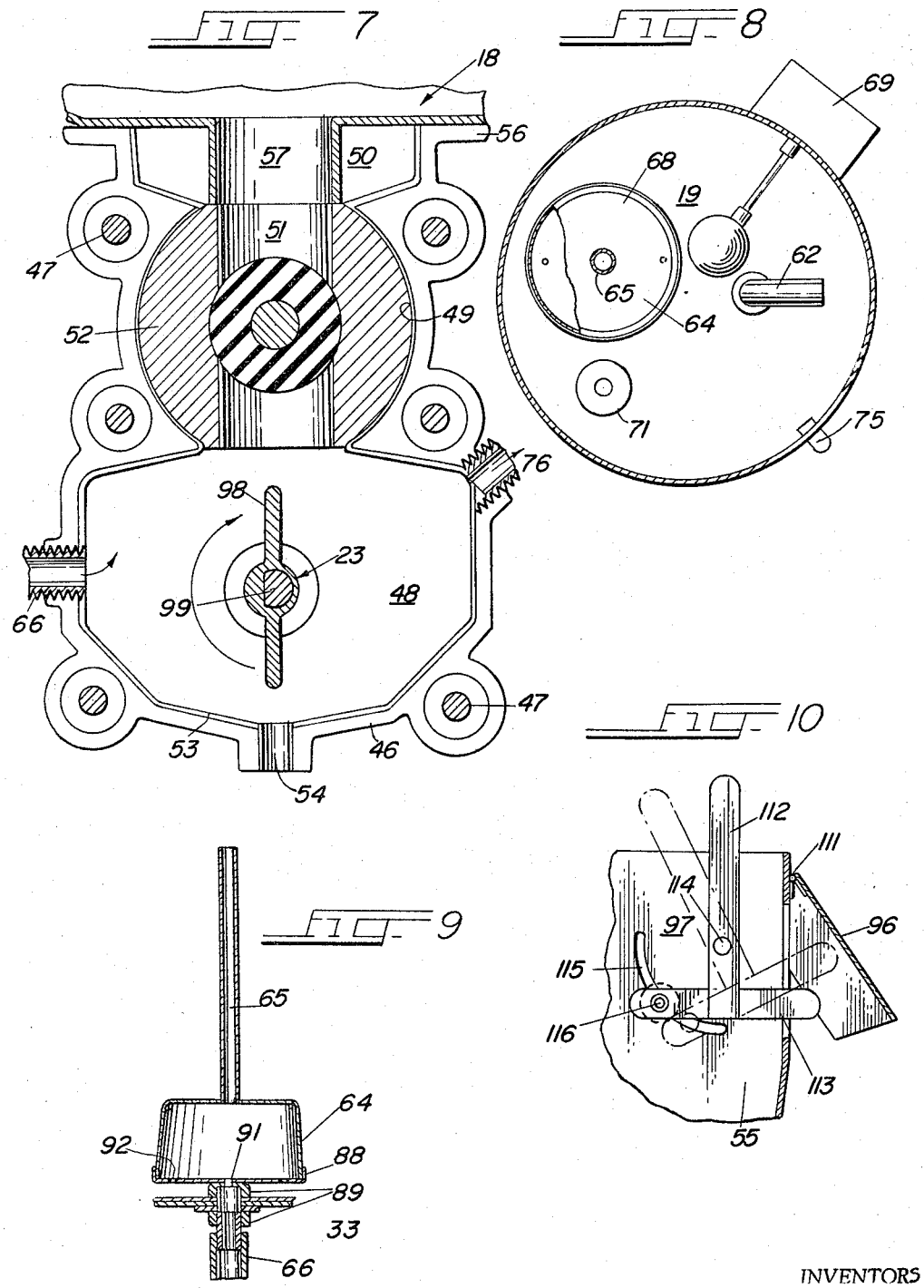

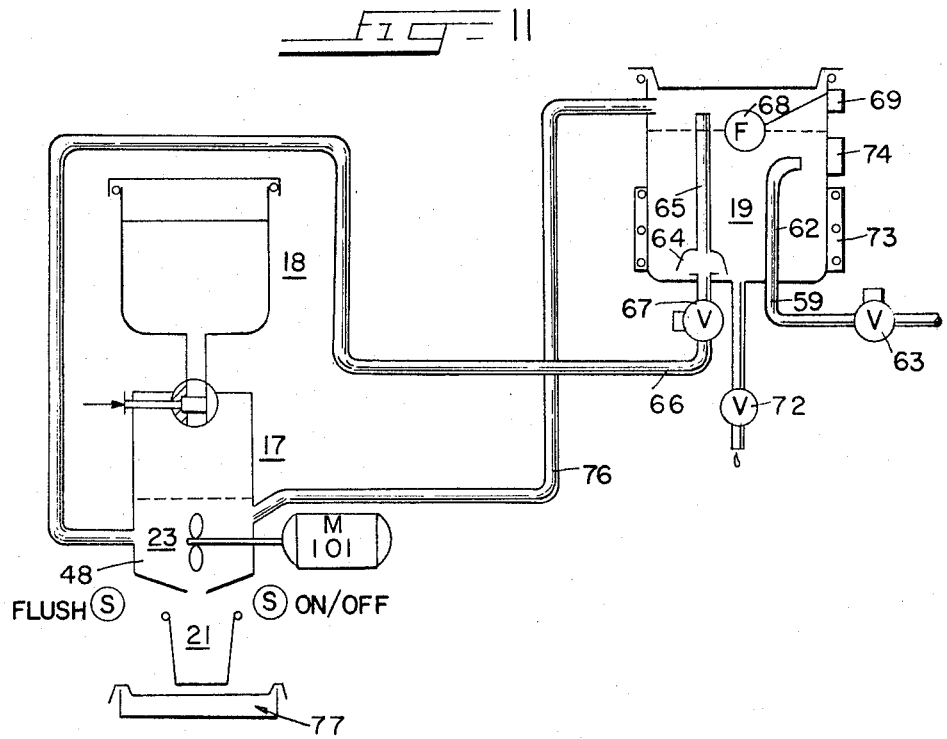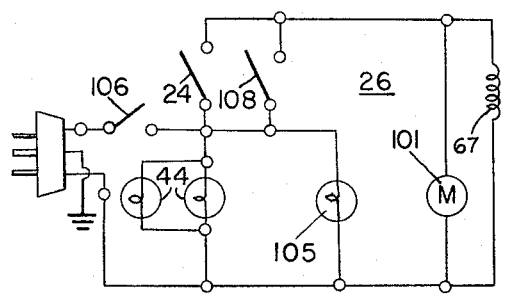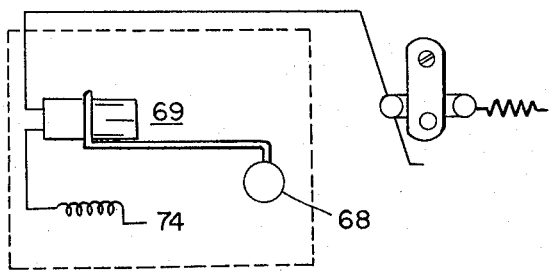
INVENTORS
RICHARD J. SKIERA
EDWARD W. MELCHIOR

_United States Patent Office_

3,382,897
Patented May 14, 1968

3,382,897
BLENDED BEVERAGE DISPENSING MACHINE
Richard J. Skiera, Chicago, and Edward W. Melchior,
Hoffman Estates, Ill., assignors to Karma Corporation,
Addison, Ill., a corporation of Illinois
Filed May 25, 1965, Ser. No. 458,732
4 Claims. (Cl. 141—107)

ABSTRACT OF THE DISCLOSURE

A beverage-concentrate measuring-blending-whipping receptacle juxtaposed to a beverage-concentrate reservoir and a heated liquid diluting reservoir from which measured quantities of the concentrate and liquid are delivered to and whip-blended in an agitator chamber to permit the manual control of repeated dispensing of cups of hot beverage in a uniform blend and quantity for immediate consumption, as desired.

---

This invention relates to devices for whipping and blending a beverage concentrate and a heated diluting fluid to dispense a hot beverage ready for immediate consumption.

The main objects of this invention are: to provide an improved machine for the repeated automatic dispensing, for immediate consumption, of a hot beverage whipped and blended from a concentrate and a heated diluting liquid; to provide a machine of this kind having an improved structure and associated arrangement of beverage-concentrate and diluting-liquid reservoirs with a whipping and blending and dispensing mechanism; to provide a machine of this kind with improved means for delivering to the blending-whipping and dispensing mechanism measured quantities of concentrate and heated diluting liquid; to provide improved manually-operable means for effecting the repeated controlled-dispensing of the blended beverage into containers; to provide an adjustable stop associated with the manually-operable means for regulating the richness of the blended beverage; to provide an improved beverage-dispensing machine of this kind especially adapted for use in dispensing a hot beverage blended from a liquid chocolate and heated water; to provide an improved blended-beverage dispensing machine of this kind of such simple and compact structuring as to make its manufacture economical and its operation facile and efficient especially for use by public eating and drinking establishments; and to provide an improved blended-beverage dispensing machine of this kind which, in association with a conventional coin-operated mechanism, could be located for use in public places.

In the adaptation shown in the accompanying drawings:

FIG. 1 is a front, perspective view of a beverage-dispensing machine constructed in accordance with this invention;

FIG. 2 is a view similar to FIG. 1 but showing the housing in phantom and the beverage-concentrate and diluting-liquid reservoirs in full outline;

FIG. 3 is a rear perspective of what is shown in FIG. 2;

FIG. 4 is a fragmentary view taken on the plane of the line 4—4 of FIG. 1 showing a part of the means for determining the enrichment of the dispensed beverage;

FIG. 5 is a front-to-rear sectional view of the machine taken on the plane of the line 5—5 of FIG. 1;

FIG. 6 is a slightly-enlarged view of a part of the dispensing-control mechanism taken on the plane of the line 6—6 of FIG. 5;

FIG. 7 is an enlarged, vertical, sectional view of the blending receptacle taken on the plane of the line 7—7 of FIG. 5;

FIG. 8 is a horizontal, sectional view of the diluting-liquid reservoir taken on the plane of the line 8—8 of FIG. 5;

FIG. 9 is a vertical sectional view of the means for controlling the flow of diluting liquid to the blending receptacle, taken on the plane of the line 9—9 of FIG. 5;

FIG. 10 is a fragmentary, side elevation of the means for controlling the flow of beverage concentrate to the blending receptacle, taken on the plane of the line 10—10 of FIG. 1;

FIG. 11 is a schematic arrangement of the functional relationship of the dispensing machine;

FIG. 12 is a schematic view of the electrical circuit including the devices that control the operation of the machine to blend and dispense the desired quantity of beverage; and FIG. 13 is a schematic arrangement of the means for maintaining a requisite supply of heated diluting liquid.

A blended-beverage dispensing machine embodying the foregoing concept comprises a housing 16 wherein is enclosed a beverage-blending receptacle 17 positioned for converting a quantity of a beverage concentrate from a reservoir 18 and a diluting liquid from a reservoir 19 for the recurring discharge of a whipped-blended beverage into a container 21, as controlled by a manually-operable valve-element 22 for activating a motor-driven whipper-agitator 23 through the closing of a normally-open switch (FIG. 6) 24 interposed in an electric circuit 26.

The housing 16 here is shown as a multiple piece structure of general rectangular form with side walls 27 and rear and front walls 28 and 29 supported on a base 31 (FIGS. 1 and 5) having corner rubber feet or pads 32 of a material that will avoid injurious contact with a counter or table on which they seat. A nearly-medial horizontal partition 33 divides the interior of the housing 16 into a lower compartment 34, a rear closed compartment 35, and a forward compartment 36. The compartment 36 formed, inwardly of front wall 29, mounts a hood 37, pivotally secured by hinges 45, to the upper wall 41 of the compartment 36. The rear compartment 35 encloses the hereinafter-described diluting-liquid reservoir 19, which reservoir 19 is closed by a dish-like lid 38, the perimetrical flange 39 of which seats on a rubber or plastic ring 40 which in turn is secured to that part of the upper wall 41 defining the opening which affords access to the reservoir 19. The forward compartment 36 encloses the hereinafter-described beverage-concentrate reservoir 18.

The rear vertical wall 28 of the housing 16 and the front wall 29 are cut out and have translucent panels 42 and 43, respectively, of plastic material inserted therein. Behind these panels 42 and 43 are lights 44 (FIG. 5) for illuminating legends applied to the panels 42 and 43.

The blending-receptacle 17 is formed of two identical dish-shaped members 46 (FIG. 7) of irregular perimetrical contour secured together by suitable fasteners 47 in opposed sealed relationship to form the three vertically-aligned chambers 48, 49 and 50 (FIG. 7). Preferably, the members 46 are molded plastic.

These members 46 are identical in structure and assembly with those same parts shown in the co-pending application, now Patent 3,159,190. Their irregular contour is determined, primarily, by the requirement to have the blending chamber 49 of horizontal elongated shape for the effective functioning of the agitator 23; and, secondarily, to provide for the funnel-like form of the chamber 50 to direct the concentrate flow into the radial channel 51 in the cylinder 52 secured in the chamber 49.

The perimetrical rims of these two identical dish-shaped members 46 have integrated therewith pointed ribs. These ribs, when the two parts are secured together, come into firm contact to form a perimetrical seal to the chambers 48, 49 and 50.

In their base parts, the members 46 are recessed to provide blended-beverage discharge port 54 from the chamber 48. At the upper ends the members 46 are formed with perimetrical flanges 56 for the support of the concentrate reservoir 18.

This blending receptacle 17 is mounted on an offset part 30 (FIG. 5) of the wall 29 of the housing 16 directly below the forward upper compartment 36. A specially-formed box 55 is suitably attached to the wall 29 to completely enclose the receptacle 17 in positon below the reservoir 18.

The beverage-concentrate reservoir 18 here is shown as of cylindrical form with the lower portion having a restricted circular port 57 (FIG. 5) through which the concentrate is directed to the funnel-like chamber 50 of the blending receptacle 17. A suitable cover 58 sets over the top of the reservoir 18. It is this structuring that permits the facile positioning of the reservoir 18 on the receptacle flange 56, with the outlet port 57 set in the funnel chamber 50. The hood 37, hinged to the housing 16 at 45, allows for swinging the hood into a fully retracted position, as may be needed.

The diluting-fluid reservoir 19 here is shown as a cylindrical tank set on the housing partition 33 in the upper rear compartment 35. A water-supply pipe 59 is connected in a conventional manner at 61, to a tube 62 extending up into the reservoir 19 with its outlet-end directed toward a thermostat 74. A solenoid-valve 63 (FIGS. 3 and 11) is interposed in the line 59 to regulate the level of liquid in the reservoir 19, as will be explained presently. A liquid-dispenser cup 64 with an upstanding air-vent tube 65 is connected to a conduit 66 leading to the blending chamber 48. A solenoid valve 67 is interposed in the conduit 66 to regulate the flow of liquid to the blending chamber 48, as will be explained presently.

The liquid-dispenser cup 64, here shown as of inverted, frustrum-shape with a cover 88, is secured by means of a connection 89 to the conduit 66 (FIG. 9). A central opening 91 registers with the upper end of the conduit to admit thereto the liquid as it accumulates in the cup 64 (FIG. 9). Such liquid enters the cup through one or more small apertures 92 concentrically arranged with respect to the opening 91. The tube 65, secured to the base of the inverted cup 64, extends above the normal water level in the reservoir 19. This ensures the admission of air into the cup 64 to avoid creating a vacuum in the conduit leading to the blending chamber 48.

A conventional float 68, arranged in the reservoir 19, is connected to a mercury switch 69, of normal construction (see FIGS. 5 and 11) to control the solenoid valve 63 in the conventional manner to maintain a predetermined level of liquid in the reservoir 19.

A drain pipe 71 is connected to the bottom of the reservoir 19 and controlled by a manually-operable valve 72 (FIG. 11). An electrical heating element 73 embraces the reservoir 19 to maintain the liquid therein at a predetermined temperature regarded as best suited for the most effective blending of the beverage. A conventional thermostat 74 regulates the functioning of the heating unit 73. To obtain quicker heater response, the outlet end of pipe 62 is directed toward the thermostat 74. Therefore, the cold water entering the chamber 19 being directed at the thermostat causes the thermostat to immediately effect the heater's response to operative condition.

A part 75 connected to a suitable pipe (not shown) leading to a waste facility provides for the possibility of an overflow in the reservoir 19.

The reservoir 19 has a secondary pipe 76 connected thereto above the liquid level and leading to the blending chamber 48 at a point opposite and, preferably, above the connection of the fluid-supply conduit 66 to the blending chamber 48. The function of this auxiliary pipe 76 will be indicated in the later explanation of the operation of the machine.

The container 21, into which the blended beverage is discharged, from the blending chamber 48, here is shown as a cup. Obviously, the container 21 could be other than such. However, the cup-type container here is shown since the machine is designed primarily for use in public eating places to serve a hot beverage that is to be consumed immediately. The cup, whatever its type, may be of any size, as will be explained presently. The control of the machine is manual so that the amount of beverage may be determined by what the cup will hold.

A tray 77, of special form and attachment to the housing 16, positions the container 21 to receive the hot blended beverage as it is discharged through the port 54. Such a tray 77 here is shown as comprising a rectangular-shaped dish-like element 78 in the form of molded plastic (FIG. 5). It has a depending perimetrical rim 79, on which it rests, with a depressed interior 80 offset below a perimetrical ledge 81 on which rests a panel 82. The tray 77 is arranged for easy attachment to and removal from the housing 16 in its normal position on a counter or table. An elongated bar 83 is secured, by screws 84, to the under forward edge of the housing base 31 with a portion of the bar 83 exposed outwardly of the housing base 31. The ends of the exposed bar portions are formed with recesses (not shown) to seat shoulders 87 on the element 78 formed by cutting away the major part of the one side of the supporting rim 79 (FIG. 5). This easy detachment of the tray 77 from the housing 16, and the separation of the element 78 and panel 82, makes for easy and thorough cleaning, resulting from the inevitable spilling of beverage on the tray 77.

The manually-operable valve-element 22 (FIG. 5) comprises a rod 93 mounting a plug 94 and biased by a pair of springs 95 to position the plug 94 to close the channel 51 subject to the rod 93 being retracted by hand-pressure on a plate 96 to the extent permitted by a beverage-enrichment control-stop 97 (FIG. 10).

The rod 93 is reciprocably supported on hub-formations on the members 46 of the blending receptacle 17. The plug 94, here shown as of frusto-conical form, is normally disposed to close the concentrate flow through the channel 51 to the blending chamber 48. At its rear end the rod 93 extends into a U-bracket 102 (FIGS. 5 and 6) and mounts a trip 103 for the hereinafter-described switch 24. The U-bracket 102 is attached to the partition 35 by a suitable fastener adjacent the motor 101. The upwardly-extending legs of this U-bracket 102 are spanned by a pair of posts 104 respectively embraced by a pair of springs 93 which bias the rod 95 toward its extended position to dispose the plug 94 across the channel 51. The plug 94 as herein shown is set on the rod between a pair of axially-spaced washers 110 for disposition across the channel 51 in the cylinder 52. The cylinder 52 is fixedly secured within the embracing wall of the member 46.

The hand-pressure plate 96, for activating the rod 93, is provided to facilitate the retraction of the rod 93 when there is a demand for a container of beverage. This rectangular-shaped plate 96 is secured by a hinge 111 along the upper front wall of the box 55 and gravity-biased to hand down against the outer-exposed end of the rod 93.

The beverage-enrichment control-stop 97 (FIG. 10) comprises a pair of arms 112–113 fixed in the form of a T. The arm 112 is pivoted at 114 to the box 55 side wall inwardly below the hinge 111 for the plate 96 to dispose the arm 113 in transverse opposition to the plate 96 with one end extending through a slot 115, exteriorly of the front wall of the box 55. The outer end of the arm 113 thus is disposed to be contacted by the plate 96 and hence limit the inward thrust on the rod 93. The inner end of the arm 113 mounts a threaded pin 116 extending through a slot 115 in the box 55 and mounts a knurled thumb-nut 118 on its inner end. The slot 115 is arcuate in shape concentric with the pivot 114. The thumb-nut 118 is exposed in registration with a beverage-enrichment scale 119 formed on one end face of the box 55 (FIG. 4).

The agitator 23 here is shown as a two-vane paddle 98 keyed to shaft 99 extending from the motor 101 (see FIG. 5) mounted in the lower housing compartment 34. The shaft 99 is supported by bearing 100 carried by member 46. The motor 101 is connected in the circuit 26 to effect its operation upon the closing of the switch 24.

The switch 24, of conventional micro-type, is fixed on the U-bracket 102 (FIG. 6) to dispose it in position to be activated by the trip 25, upon the manual retraction and retained positioning of the rod 93.

The trip 25 is fixed to the inner end of the rod 93. This trip 25, as will be noted from FIG. 6, has rearwardly-extending finger 25a with an angularly-disposed end-cam 25b positioned to engage a roller 24a on the switch 24, to close the circuit 26 for effecting the blending of the concentrate and liquid and the dispensing of the resulting beverage. Such an angled cam 25b on such a length of finger 25a is provided to attain two results. First, the closing of the circuit 26 at a fixed point in the retraction of the rod 93, regardless of how the stop 97 is set. Secondly, maintaining the circuit 26 closed as long as the plate 97 is held depressed against the action of the springs 95.

The electric circuit 26, as indicated in FIG. 12, is very simple. In this are included the lights 44, the motor 101, the solenoid valve 67, an indicator light 105 and three switches 106, 24, and 108. The indicator light 105 is located on the front of the housing 16 (FIG. 1) to make known that the circuit is closed for the normal functioning of the machine, as determined by the closing of the switch 106. The switch 108 is an alternative to the switch 107 for use in an occasional flushing of the blending receptacle 48, as will be explained presently.

The operation of the herein shown and described beverage dispensing machine is as follows:

As a prelude to putting the machine into service for dispensing a hot blended beverage, the reservoir 18 is filled with a predetermined quantity of the beverage concentrate. Concurrently, the reservoir 19 is filled with the diluting liquid and time allowed for it to be heated to the requisite temperature determined by the thermostat-controlled heater 73.

Also, the beverage-enrichment control-stop 97 (FIGS. 4 and 10) is set for predetermining the quantity of beverage concentrate that is desired to have discharged through the channel 51 into the blending chamber 48.

With the container 21 in place on the tray 77, and the circuit switch 106 closed, the plate 96 is depressed against the rod 93 to retract it the full limit permitted by the contact of the plate with the opposed end of the arm 113, FIG. 10. This results in a shifting of the rod 93, to the extent permitted by the plate in contact with the stop 97 (FIG. 10) and retracting the plug 94 to open the channel 51 (FIGS. 5 and 7) to a predetermined flow of concentrate into the blending chamber 48.

The instant the trip-cam 25a depresses the switch-roller 24a of switch 24 the circuit 26 is closed to activate the solenoid valve 67 (FIG. 12) substantially simultaneously with the retraction of the plug 94 to open the channel 51. Consequently, there is a concurrent released flow of liquid and a released flow of beverage-concentrate into the blending chamber 48. Also, concurrently, the circuit 26 is closed to the motor 101 (FIG. 12) to initiate the revolution of the paddle 98 to effect the blending of these two fluids.

The size of the container 21 and/or the amount of beverage that is to be discharged into the container will determine how long the plate 96 is held depressed. A brief bit of practice and observation of such an operation of the machine will determine how long the plate 96 should be depressed to ensure the discharge of the proper amount of beverage into a particular size of container 21 without waste of either the concentrate or the liquid.

By reason of the very high speed of the agitator 23 (approximately 8000 r.p.m.) and the splashing of the contents of the blending chamber 48, any tendency toward creating a backpressure in the chamber 48 is avoided by reason of the connection of the pipes 76 between the liquid reservoir 19, above the level of the liquid therein, and the blending chamber 48. Such connection permits the churning contents of the chamber 48 to rise in the pipe 76 a sufficient distance to dissipate any tendency there otherwise might be toward creating a back-pressure.

Upon release of the plate 96 the springs 95 will snap the rod 93 forwardly into its normally-extended position. This will cause the plug 94 to cut off the flow of concentrate through the channel 51. The retraction of the switch-trip 25 will open the circuit 26 thereby releasing the solenoid valve 67 to shut off the flow of liquid through the conduit 66.

The blended beverage thereupon freely flows through the outlet port 54 into the container 21. At the same time any back-up of the chamber contents into the pipe 76 will flow back into the chamber 48 and become a part of the blended beverage draining into the container 21. Thereupon the filled container 21 is ready to be handed to the patron who has requested the beverage which this machine has been equipped to supply.

Frequent cleaning of the blending chamber 48 and the paddle 98 is effected merely by closing the switch 108. This closes the circuit 26 to the solenoid valve 67 and to the motor 101, independently of the switch 24. Thereupon, the hot water from the reservoir 19 will flow into the blending chamber 48 and the rotating paddle 97 will swish the water against the chamber walls and wash away any film that may have adhered thereto. The flow of water and the rotation of the paddle 98 will continue as long as the switch 108 is held closed.

Although but one specific embodiment of this invention is herein shown and described, it will be understood that numerous details of the construction shown may be altered or omitted without departing from the spirit of the invention as defined by the following claims.

We claim:

1. A beverage-dispensing machine comprising, a supporting housing, a blending receptacle fixed on the housing, a motor-driven agitator journaled in the receptacle, a beverage-concentrate and diluting-liquid reservoir juxtaposed to the blending receptacle, a conduit connecting the liquid reservoir with the blending receptacle, a channel between and communicating with the concentrate reservoir and the blending receptacle, a valve element interposed in the channel, rod means manually operable to control the flow of concentrate to the blending receptacle, a switch positioned for actuation by the rod means, circuitry connecting the agitator motor, the liquid control means and the switch with a source of electrical current, manually operable means for simultaneously shifting the valve element and effecting a controlled flow of beverage from the blending receptacle, and means on the housing for selectively limiting movement of the rod means to thereby control the rate of flow of beverage-concentrate to the blending receptacle.

2. A beverage-dispensing machine as set forth in claim 1 wherein the rod means is spring-biased to dispose the valve element to close the beverage-concentrate flow through the channel.

3. A beverage dispensing machine as set forth in claim 2 wherein the switch is normally open and located in adjacent alignment with the rod means to be closed by the manual retraction of the rod means to effect the dispensing of the beverage.

4. A beverage-dispensing machine comprising, a housing, a beverage-concentrate reservoir arranged in the upper part of the housing, having an opening in the bottom thereof, a blending receptacle suspended from the beverage concentrate reservoir, defining a beverage-blending chamber in the lower part thereof, having a vertical channel for the flow of concentrate to the blending chamber, and having a beverage-discharge port in the lower end thereof, a motor-driven agitator rotatively mounted in the blending chamber, a diluting-liquid reservoir arranged in the housing, a conduit connecting the diluting-liquid reservoir with the blending chamber of the receptacle, a rod reciprocably mounted in the housing transversely of the concentrate-flow channel, having the forward end thereof exposed relative to the housing, and manually actuated for effecting the flow of concentrate and liquid from the reesrvoir to the blending chamber, a plug fixed on the rod for movement into and out of position for closing and opening the channel in the receptacle, means normally biasing the rod to position the plug to close the channel in the receptacle, an electrical switch juxtaposed to the rod for activation when the rod is depressed, means interposed in the conduit for controlling the flow of liquid to the blending chamber, a tray for positioning a container to receive the beverage discharged from the blending-chamber port, a plate hinged to said housing and gravity-biased to engage the exposed end of said rod for hand pressure holding of the rod to determine the flow of beverage-concentrate and liquid to the blending chamber, a selectively movable arm pivoted on the housing which engages said plate and limits the movement of said rod whereby the flow rate from the beverage-concentrate reservoir may be controlled and varied, and circuitry connecting the agitator-motor, the conduit-control means, and the switch to a source of electrical current.

References Cited

UNITED STATES PATENTS

| | | | |
|---|---|---|---|
| 1,938,416 | 12/1933 | Cook | 141—174 X |
| 2,621,901 | 12/1952 | Wheeler | 137—589 |
| 2,919,726 | 1/1960 | Zimmermann, et al. | 141—69 |
| 3,159,190 | 12/1964 | Skiera et al. | 141—82 X |
| 3,276,633 | 10/1966 | Rahauser | 222—129.1 |

LAVERNE D. GEIGER, *Primary Examiner.*

E. J. EARLS, *Assistant Examiner.*